United States Patent
Stoll

(10) Patent No.: US 6,695,123 B2
(45) Date of Patent: Feb. 24, 2004

(54) CONVEYOR BELT CLEANER BLADE

(75) Inventor: Richard D. Stoll, Chesapeake, OH (US)

(73) Assignee: Richwood Industries, Inc., Huntington, WV (US)

(*) Notice: Subject to any disclaimer, the term of this patent is extended or adjusted under 35 U.S.C. 154(b) by 0 days.

(21) Appl. No.: 10/324,526

(22) Filed: Dec. 19, 2002

(65) Prior Publication Data

US 2003/0116405 A1 Jun. 26, 2003

Related U.S. Application Data

(60) Provisional application No. 60/344,838, filed on Dec. 21, 2001.

(51) Int. Cl.[7] ............................................... B65G 45/16
(52) U.S. Cl. ....................................... 198/499; 198/497
(58) Field of Search ................................. 198/497, 499

(56) References Cited

U.S. PATENT DOCUMENTS

| 4,257,517 A | * | 3/1981 | MacPherson et al. | ........ 198/497 |
| 4,696,388 A | | 9/1987 | Stoll | |
| 4,915,211 A | * | 4/1990 | Dohmeier | .................. 198/499 |
| 4,969,553 A | | 11/1990 | Stoll | |
| 5,267,642 A | | 12/1993 | Gharpurey et al. | |
| 5,628,392 A | | 5/1997 | Stoll et al. | |
| 5,797,477 A | | 8/1998 | Veenhof | |
| 5,975,281 A | * | 11/1999 | Yoshizako et al. | ........... 198/499 |
| 6,056,111 A | | 5/2000 | Stoll et al. | |
| 6,152,290 A | | 11/2000 | Mott et al. | |
| 6,279,727 B1 | | 8/2001 | Waalkes et al. | |
| 6,321,901 B1 | | 11/2001 | Strebel et al. | |

FOREIGN PATENT DOCUMENTS

| JP | 59-194927 | * | 11/1984 | .................. 198/499 |
| JP | 3-152017 | * | 6/1991 | .................. 198/497 |
| SU | 1362692 | * | 12/1987 | .................. 198/497 |

* cited by examiner

Primary Examiner—James R. Bidwell
(74) Attorney, Agent, or Firm—Stevens & Showalter LLP

(57) ABSTRACT

A scraper blade assembly which is configured to provide a rigid material scraping edge supported on a resiliently compliant material such that the scraping edge is adapted to move in response to irregularities in an associated conveyor belt. Further, supporting structure for the resiliently compliant material is configured so as to promote an upward deformation of the resiliently compliant material when a compressive force is applied to the rigid material scraping edge to thereby form the resiliently compliant material as a supporting surface above the scraping edge when such a force is applied.

21 Claims, 2 Drawing Sheets

CONVEYOR BELT CLEANER BLADE

CROSS REFERENCE TO RELATED APPLICATION

The benefit of prior U.S. Provisional Application No. 60/344,838 filed Dec. 21, 2001 is hereby claimed.

BACKGROUND OF THE INVENTION

This invention relates to conveyor belt scraper blades, and more particularly, to blades for scraping and cleaning of high speed conveyor belts.

Cleaning the return side of a high speed conveyor belt that carries loose bulk materials has always been a particularly difficult challenge for industrial and mining companies. While various designs have achieved successes in many areas, the companies operating high speed conveyors are constantly demanding continued improvements in performance from belt cleaning equipment. There are two areas that are of primary concern for scraper blade design: the first is cleaning performance; the second is scraper blade life.

Prior designs for scraper blades have incorporated various materials for the scraper blade media, including rubber urethane, steel and tungsten carbide.

The product offerings in metal blade media by other companies have, for the most part, been of a segmented design where a cleaner blade with a metal tip is designed with a plurality of individual elements, typically 2" to 6" in width thus requiring eight to twenty-four elements to clean a conveyor belt of 48" width. These elements are typically of cast urethane design with a small piece of tungsten carbide typically 3/16" thick×½" high, molded to the wear edge of the cleaning element. The segmented design offers advantages and disadvantages. The elements are typically light weight and easy to handle. The fact that multiple units are used to cover the width of a conveyor belt however means that there is a joint between each element that can allow carryback material to pass between elements if the elements are not perfectly aligned and positioned.

Typical prior art metal edge cleaner blades of segmented design are installed with the tungsten edge at an aggressive attack angle to the conveyor belt. The accepted angle is typically 10 to 30 degrees beyond perpendicular to the conveyor belt. This design places the tungsten tip of the blade in sole contact with the conveyor belt. The hard urethane substrate portion of the element is used only as a tensioning device and as a device for possible pressure relief if the element is over stressed. There is no other support or protection for the conveyor belt. The conveyor belt is arched across the exposed tungsten cleaner blade edge. The design of the typical tension system is such that when irregular portions of the conveyor belt pass, the pressure applied by the conveyor belt toward the scraper blade is increased and the resistance of the scraper blade to the belt is increased as the flexing motion is limited by the elasticity of the urethane polymer being used to hold the tungsten carbide blade tip.

This aggressive attack angle for prior art blades and the fact that the tungsten tip is the sole portion of the element in contact with the conveyor belt means that any irregularities in the conveyor belt including vulcanized splices, metal splices and hanging threads are subject to serious damage from the tungsten cleaner edge.

The design of the cast urethane segments or elements with tungsten carbide tip is typically of a shape and configuration that allows each element to flex in the direction of belt travel. The hard urethane base that holds the tungsten tip is typically a hard material in the range of 85 to 90 durometer shore A hardness. This hard material does not move behind the tungsten tip and any flexing of the urethane element is accomplished by the structural design of the element. For example, the element is molded with a hollow cavity in it to make the support thinner and thereby allow it to bend. This is supposed to help prevent damage being caused to the conveyor belt by the element if a metal splice or some irregularity in the conveyor belt should pass the cleaner blade.

Accordingly, there is a continuing need for a scraper blade structure which effectively cleans high speed conveyors and which has an extended useful life and, in particular, there is a need for a continuous non-segmented blade using tungsten carbide or similar rigid media such as steel.

SUMMARY OF THE INVENTION

The present invention provides a scraper blade assembly which is configured to provide a rigid material scraping edge supported on a resiliently compliant material such that the scraping edge is adapted to move in response to irregularities in an associated conveyor belt. Further, supporting structure for the resiliently compliant material is configured so as to promote an upward deformation of the resiliently compliant material when a compressive force is applied to the rigid material scraping edge to thereby form the resiliently compliant material as a supporting surface above the scraping edge when such a force is applied.

In accordance with one aspect of the invention, a scraper blade assembly for a conveyor belt scraper is provided comprising: an elongated blade body including a resilient backing member formed of a resilient material and defining a central longitudinal scraper blade axis, the resilient backing member including opposing sides, first and second faces extending longitudinally between the sides, and an upper surface located between the first and second faces and extending longitudinally between the sides; a longitudinally extending support frame attached to the elongated body and defining opposing first and second ends; end plates attached to the first and second ends for attaching the blade assembly to support structure such that the elongated body extends transversely of an associated conveyor belt; and the elongated body further including an elongated metal face plate attached to the first face of the resilient backing member and comprising a continuous strip of material having an upper edge adjacent the upper surface extending from the first end to the second end of the support frame.

In accordance with another aspect of the invention, a scraper blade assembly for a conveyor belt scraper is provided comprising: an elongated blade body including a resilient backing member formed of a resilient material and defining a central longitudinal scraper blade axis, the resilient backing member including opposing sides, first and second faces extending longitudinally between the sides, and an upper surface located between the first and second faces and extending longitudinally between the sides; a longitudinally extending support frame attached to the elongated body for supporting the elongated body extending transversely of an associated conveyor belt; the resilient backing member including an upper portion extending upwardly from an upper edge of the support frame; the elongated body further including an elongated metal face plate attached to the first face of the resilient backing member at the upper portion and having an upper edge adjacent the upper surface of the resilient backing member; a rigid backing member extending upwardly from the upper edge of the support frame along a substantial portion of the second face of the resilient backing member for supporting the upper portion of the resilient backing member against movement when a force is applied against the metal face plate.

In accordance with yet another aspect of the invention, a scraper blade assembly for a conveyor belt scraper is provided comprising: an elongated blade body including a resilient backing member formed of a resilient material and defining a central longitudinal scraper blade axis, the resilient backing member including opposing sides, first and second faces extending longitudinally between the sides, and an upper surface located between the first and second faces and extending longitudinally between the sides; a longitudinally extending support frame attached to the elongated body for supporting the elongated body extending transversely of an associated conveyor belt; the resilient backing member including an upper portion extending upwardly from an upper edge of the support frame; the elongated body further including an elongated rigid face plate attached to the first face of the resilient backing member at the upper portion and having an upper edge for scraping material from an associate conveyor belt, the upper surface of the resilient backing member being coextensive with the upper edge of the face plate for providing support to the conveyor belt; the rigid face plate comprising a continuous rigid structure supported out of contact with the support structure, and extending the entire length of the elongated blade body for extending substantially the entire width of an associated conveyor belt; a rigid backing member extending upwardly from the upper edge of the support frame along a substantial portion of the second face of the resilient backing member for supporting the upper portion of the resilient backing member against movement when a force is applied against the rigid face plate.

Other aspects of the invention will be apparent from the following description, the accompanying drawings and the appended claims.

DETAILED DESCRIPTION OF THE PREFERRED EMBODIMENT

Figure 1:
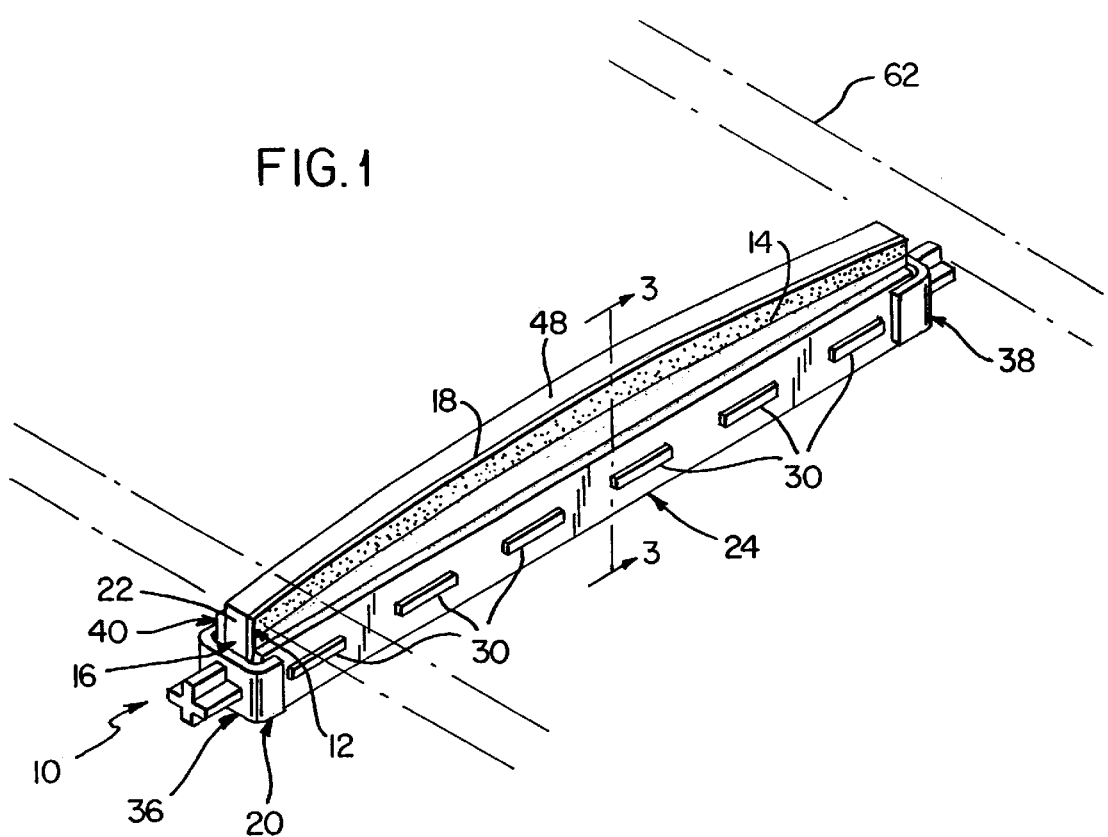
FIG. 1 is a perspective view of the scraper blade assembly of the present invention.
Figure 3:
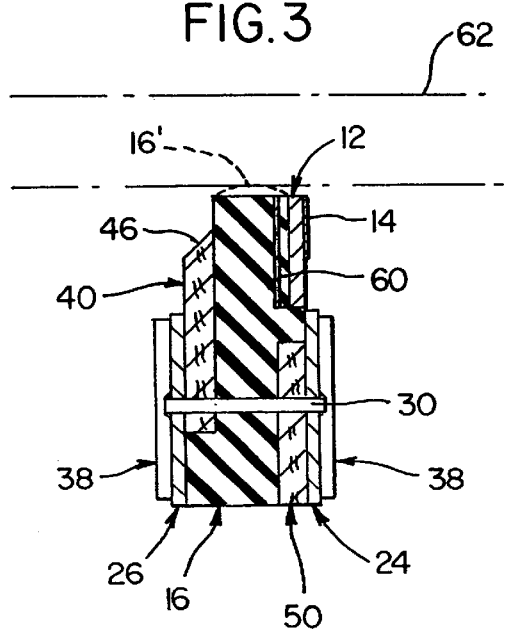
FIG. 3 is a cross-sectional view taken along line 3—3 in FIG. 1.
Figure 2:
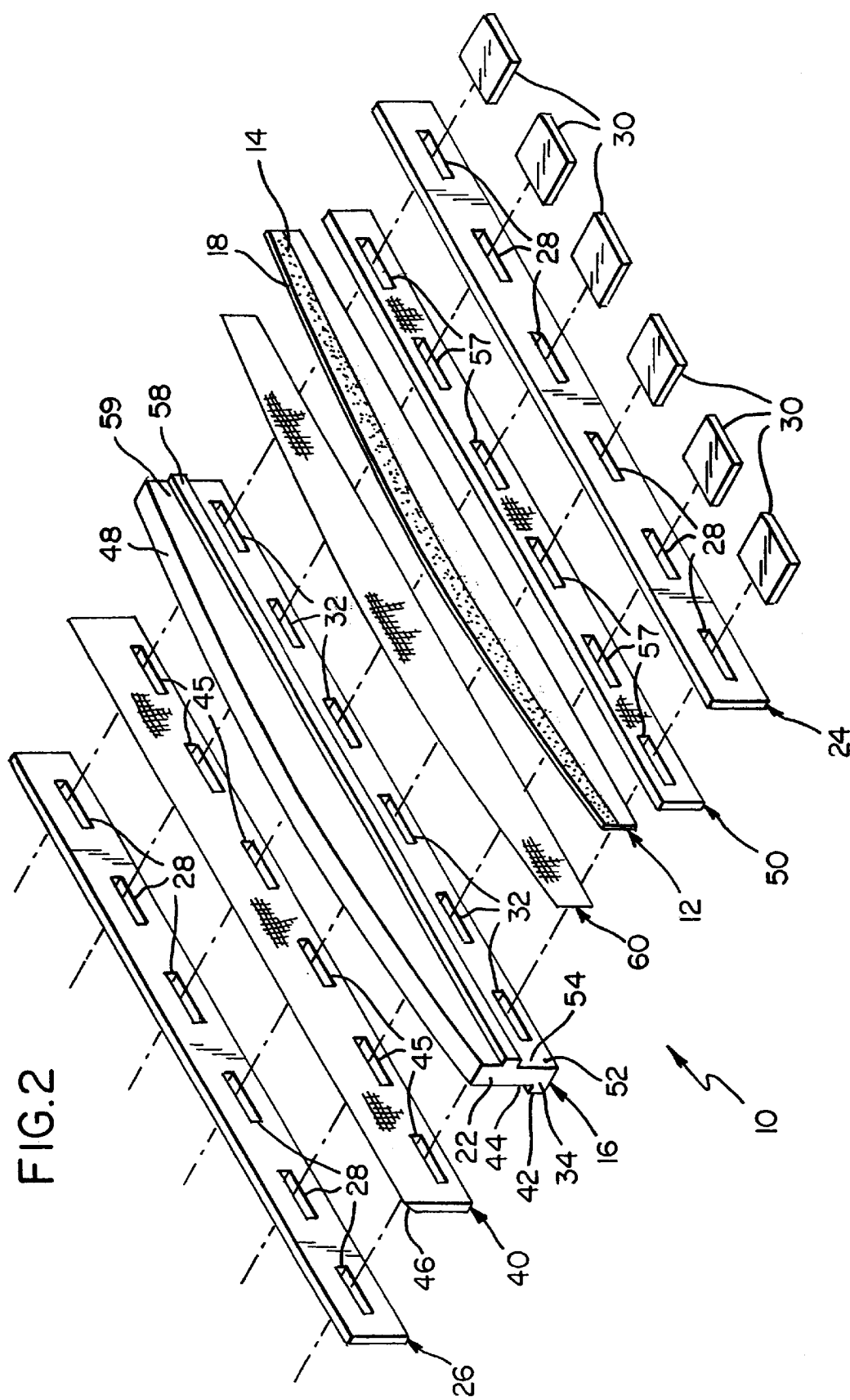
FIG. 2 is an exploded view illustrating the components forming the scraper blade assembly.

Referring to FIGS. 1–3, the present invention comprises a scraper blade assembly for use in applications such as described in U.S. Pat. No. 5,628,392, which patent is owned by the assignee of the present application and is incorporated herein by reference. The present design is of a scraper blade assembly 10 with a continuous metal face plate 12, which is preferably 36,000 psi mild steel, and including a wear edge 18 of tungsten carbide 14, or similar abrasion resistant material, fused thereto in a continuous length, such that the abrasion resistant element extends the full width of a conveyor belt without the need for a plurality of elements. The metal face plate 12 of the blade assembly 10 is molded to a solid yet soft resilient backing member 16 having a durometer hardness of 40 to 60 shore A. The resilient backing member 16 is preferably formed of a rubber material, which is preferably a natural and synthetic rubber blend, and extends the full width of the blade assembly 10 behind the metal face plate 12. In addition, the resilient backing member 16 extends downwardly to a main steel support frame 20 whereby an upper portion 22 of the resilient backing member 16 is supported for flexing movement above the support frame 20.

The support frame 20 is formed with a structure similar to that described for the support frame in the above referenced U.S. Pat. No. 5,628,392 and includes first and second elongated frame plates 24, 26 extending the length of the blade assembly 10 and formed with a plurality of apertures 28. Rectangular metal slugs 30 extend between the frame plates 24, 26, passing through the apertures 28, and through apertures 32 formed in a lower portion 34 of the resilient backing member 16. The ends of the metal slugs 30 are welded to the frame plates 24, 26 to form a rigid structure for the support frame 20. In addition, end members 36, 38 are provided welded to the ends of the frame plates 24, 26 to thereby define opposing ends for supporting the blade assembly 10 in a support structure, such as an air pressure actuated tension system as is disclosed in U.S. Pat. No. 4,969,553, which patent is owned by the assignee of the present application and is incorporated herein by reference.

The blade assembly 10 further includes a rigid sacrificial fiber backing plate 40 located on a back side 42 of the resilient backing member 16 wherein the fiber material forming the backing plate 40 is preferably formed of a phenolic resin impregnated fiber. The fiber backing plate 40 is set or positioned in an off-set recess 44 formed in the back side 42 of the resilient backing member 16, and includes a plurality of apertures 45 for passage of the metal slugs 30 therethrough. The fiber backing plate 40 additionally includes an upper beveled edge 46 located below the level of an upper edge surface 48 of the resilient backing member 16. The fiber backing member 40 extends from a location below the upper edge of the support frame 20 upwardly along a substantial vertical portion of the upper portion 22 of the resilient backing member 16 and operates to support the resilient backing member 16 and prevent it from folding backward in the direction of belt travel. The beveled edge 46 prevents debris from collecting between the upper edge of the fiber backing plate 40 and a conveyor belt.

A further fiber backing plate 50, formed of the same material as the fiber backing plate 40, is provided located on a front side 52 of the resilient backing member 16. The fiber backing plate 50, is set or positioned in an off-set recess 54 formed in the front side 52 of the resilient backing member 16, and includes a plurality of apertures 57 for passage of the metal slugs 30 therethrough. The fiber backing plates 40, 50 are preferably vulcanized with the rubber material during the molding operation forming the resilient backing member 16.

It should be noted that the recesses 44, 54 are generally L-shaped in section and extend longitudinally the length of the resilient backing member 16. In addition, a rib 58 extends longitudinally of the resilient backing member 16 separating the face plate 12 from the fiber backing plate 50, and the face plate 12 is positioned in an L-shaped recess 59 located above the rib 58 in the upper portion 22 of the resilient backing member 16.

The present invention provides a sandwich construction for the blade assembly 10 wherein the resilient backing member 16 is approximately 1 to 1–½ inch thick, the metal face plate 12 is ³⁄₁₆ to ¼ inch thick, the tungsten carbide 14 wear edge is ⅛ inch thick or less, and the fiber back plates 40, 50 are ½ inch thick, such that the overall thickness of the components within the frame structure is approximately 1–¾ to 2 inches. It should be understood that the metal face plate 12, and fiber backing plates 40, 50 are positioned within the mold forming the resilient backing member 16, such that they are bonded together with the resilient backing member 16 in the molding process.

For the present invention, the resilient backing member 16 is of critical importance when used in conjunction with the rigid debris scraping structure comprising the metal face plate 12 and tungsten carbide edge 18. The metal face plate 12 with the tungsten carbide wear edge 18 is molded to the resilient backing member 16, such that there is no substantial contact between the face plate 12 and the rigid structure forming the support frame 20, which rigidly holds the lower portion 34 of the resilient backing member 16 with the rigid fiber backing plates 40 and 50. This allows the face plate 12 to "float" in the resilient backing member 16. This float characteristic essentially allows the face plate 16 to react to forces imposed on it in the same manner as the resilient backing member 16 reacts.

When the blade assembly 10 is placed into service, the tungsten wear edge 18 is positioned perpendicular to the conveyor belt 62 in such a manner that the upper edge surface 48 of the resilient backing member 16 is also in contact with the conveyor belt 62. This sandwich construction is important for safety, as well as for efficient cleaning of the conveyor belt 62. When the conveyor belt 62 is in operation, the motion of the conveyor belt 62 exerts a force on the tungsten wear edge 18. The resilient backing member 16 backing up the tungsten wear edge 18 is contained in front by the steel element of the face plate 12 and it is contained in the rear by the fiber board backing plate 40. An important functional feature of this sandwich design is held in the fact that the resilient backing member 16, such as rubber, does not compress, it simply moves or forms a different shape when acted upon by an outside force. The material of the resilient backing member 16 will not occupy less space regardless of the compression force exerted upon it. That is why the proper material is a compound consisting primarily of soft rubber. The momentum of the conveyor belt 62 moving across the edge 18 of the scraper blade assembly 10 creates a force on the steel face plate 12 and tungsten carbide wear edge 18 that attempts to compress the rubber that is directly behind it. Since the rubber is contained in front and back by rigid materials the only place left for the rubber to move to is upward toward the conveyor belt 62, as is illustrated diagrammatically in dotted lines by 16'. The rubber media exerts a force on the conveyor belt 62, via the upper edge surface 48, that prevents the tungsten wear edge 18 from gouging or scalping the conveyor belt 62. The resistance of the rubber effectively limits the amount of force that is able to be exerted on the conveyor belt 62 by the tungsten carbide wear edge 18.

The force placed on the blade assembly 10 by the tension system supporting the blade assembly 10 is adjustable, such as by adjusting an air pressure that energizes the tension system, as discussed in the above . The resistance provided by the rubber portion of the sandwich insures against aggressive introduction of the tungsten carbide wear edge. The tungsten wear edge 18 is in contact with the conveyor belt and the tungsten edge 18 effectively peels off carry-back material. The tungsten provides a rigid and sharp departure point for any carry-back material. The rubber supports the conveyor belt and prevents the conveyor belt from being raked over the exposed edge of the tungsten carbide.

In accordance with an additional aspect of the invention, a fabric layer 60 is molded into the resilient backing member 16, adjacent to and behind the face plate 12, and is preferably located approximately ¼ inch from the face plate 12 such that the fabric 60 is fully embedded within the material of the resilient backing member 16. The fabric layer 60 is preferably formed of a material having a tensile strength of at least about 200 pounds per square inch. An acceptable fabric is a square woven cord such as a calendered composite of high tensile strength nylon fabric (840/1) and high quality skim compound. The fabric layer 60 limits overstretching of the resilient backing member 16 supporting the metal face plate 12, and in particular operates to prevent the material of the resilient backing member 16 from being pulled or stretched in an upward direction by the force of the conveyor belt 62 if the metal face plate 12 should crack or break.

Support of the conveyor belt by the resilient backing member 16 in this manner is also a critical factor in protecting splices in the conveyor belt. Splices that are vulcanized are subject to damage from over aggressive belt cleaner devices. The present design prevents the extreme stresses that occur with tungsten/urethane cleaner blades. Conveyor belts are also frequently spliced with metal fasteners. The present design, because of the tungsten/rubber combination, permits the sandwich blade assembly 10 to be used on belts where metal splices are present. The rubber forming the resilient backing member 12 in the present blade assembly 10 helps support the belt and the splice while maintaining an angle between the conveyor belt and the cleaner blade of 90 degrees. When the attack angle of the cleaner blade exceeds 90 degrees, the potential for accelerated wear and damage to metal splices exists.

The blade assembly 10 is positioned and oriented with its length being perpendicular to the conveyor belt and is provided in various lengths so that the length of the blade assembly 10 is the same as the width of the conveyor belt on which it is employed.

The continuous metal (or tungsten carbide) edge 18 of the blade assembly 10 prevents carryback material from passing by the blade assembly 10. There are no segments and therefore no joints between segments that would allow carryback material to pass through. The tungsten wear edge 18 of the present blade assembly 10 utilizes a flexible unfired tungsten material that is first formed to the shape of the cleaner blade and then fired at high temperatures so the steel face plate 12 and the tungsten 14 are fused together as one piece.

The blade assembly 10 can be made in various shapes including but not limited to a straight rectangular shape, a convex shape and modified straight or modified convex shapes to accommodate the conveyor belt conditions being encountered.

It should be noted, however, that the present design particularly facilitates a construction in which a continuously curved metal blade may be installed for conveyor belt cleaning. In particular, the conveyor belt typically may take on an upwardly curved shape across the width of the belt in the area where it passes the blade assembly, and it is desirable to have the upper scraping edge of the assembly shaped to a curved contour. While prior blade assemblies having curved scraping edges defined by a resilient material are known, a metal blade having a continuous curvature spanning the width of the conveyor belt has not been available and is made possible by the present resilient mounting configuration for the tungsten carbide coated metal blade.

Accordingly the blade assembly of the present invention provides several key features and advantages including a continuous one piece rigid metal element across (perpendicular to) the width of the belt, preventing carryback material migration between segments; a rubber matrix which holds, supports and cushions the metal edge; a rubber matrix design which supports the conveyor belt as it passes over the metal edge of the blade assembly helping prevent belt wear, wear on splices and damage to splices and prevents damage to the conveyor belt; and including the rigid fiber board backing material that is the last part of the sandwich behind the rubber preventing the rubber from flexing too far, allowing the rubber to provide the necessary support for the conveyor belt as it passes the blade edge. It has been found the present blade design additionally provides for extended blade life, and is capable of providing a blade life at least five times that of an equivalent rubber cleaning blade.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A scraper blade assembly for a conveyor belt scraper comprising:

an elongated blade body including a resilient backing member formed of a resilient material and defining a central longitudinal scraper blade axis, said resilient backing member including opposing sides, first and second faces extending longitudinally between said sides, and an exposed upper surface located between said first and second faces and extending longitudinally between said sides for engaging a conveyor belt passing over said elongated blade assembly;

a longitudinally extending support frame attached to said elongated body and defining opposing first and second ends;

end plates attached to said first and second ends for attaching said blade assembly to support structure such that said elongated body extends transversely of an associated conveyor belt; and said elongated body further including an elongated metal face plate attached to said first face of said resilient backing member out of contact with said support frame and comprising a continuous strip of material having an upper edge adjacent said exposed upper surface of said resilient backing member extending from said first end to said second end of said support frame.

2. The scraper blade assembly of claim 1 wherein said face plate is molded in place on said resilient backing member.

3. The scraper blade assembly of claim 1 wherein said face plate includes a tungsten carbide coating defining a wear edge on said face plate.

4. The scraper blade assembly of claim 1 wherein said metal face plate defines a continuously curved scraping edge extending across the length of the scraper blade assembly.

5. A scraper blade assembly for a conveyor belt scraper comprising:

an elongated blade body including a resilient backing member formed of a resilient material and defining a central longitudinal scraper blade axis, said resilient backing member including opposing sides, first and second faces extending longitudinally between said sides, and an upper surface located between said first and second faces and extending longitudinally between said sides;

a longitudinally extending support frame attached to said elongated body and defining opposing first and second ends;

end plates attached to said first and second ends for attaching said blade assembly to support structure such that said elongated body extends transversely of an associated conveyor belt;

said elongated body further including an elongated metal face plate attached to said first face of said resilient backing member and comprising a continuous strip of material having an upper edge adjacent said upper surface extending from said first end to said second end of said support frame; and including a fabric member molded in said resilient backing member.

6. The scraper blade assembly of claim 5 wherein said fabric member is a woven fabric member located adjacent said face plate for limiting movement of an upper portion of said resilient member relative to said support frame.

7. The scraper blade assembly of claim 5 wherein said woven fabric member has a tensile strength of at least about 200 pounds per square inch.

8. A scraper blade assembly for a conveyor belt scraper comprising:

an elongated blade body including a resilient backing member formed of a resilient material and defining a central longitudinal scraper blade axis, said resilient backing member including opposing sides, first and second faces extending longitudinally between said sides, and an upper surface located between said first and second faces and extending longitudinally between said sides;

a longitudinally extending support frame attached to said elongated body and defining opposing first and second ends:

end plates attached to said first and second ends for attaching said blade assembly to support structure such that said elongated body extends transversely of an associated conveyor belt;

said elongated body further including an elongated metal face plate attached to said first face of said resilient backing member and comprising a continuous strip of material having an upper edge adjacent said upper surface extending from said first end to said second end of said support frame; and the scraper blade assembly including a rigid fiber backing member located between said support frame and said second face of said resilient backing member.

9. The scraper blade assembly of claim 8 wherein an upper portion of said resilient backing member extends upwardly from an upper edge of said support frame, and said rigid fiber backing member extends upwardly from said upper edge of said support frame for supporting said second face of said resilient backing member against movement.

10. A scraper blade assembly for a conveyor belt scraper comprising:

an elongated blade body including a resilient backing member formed of a resilient material and defining a central longitudinal scraper blade axis, said resilient backing member including opposing sides, first and second faces extending longitudinally between said sides, and an upper surface located between said first and second faces and extending longitudinally between said sides;

a longitudinally extending support frame attached to said elongated body and defining opposing first and second ends;

end plates attached to said first and second ends for attaching said blade assembly to support structure such that said elongated body extends transversely of an associated conveyor belt;

said elongated body further including an elongated metal face plate attached to said first face of said resilient backing member and comprising a continuous strip of material having an upper edge adjacent said upper surface extending from said first end to said second end of said support frame; and wherein said resilient backing member comprises 40–60 durometer shore A rubber.

11. A scraper blade assembly for a conveyor belt scraper comprising:

an elongated blade body including a resilient backing member formed of a resilient material and defining a central longitudinal scraper blade axis, said resilient backing member including opposing sides, first and second faces extending longitudinally between said sides, and an exposed upper surface located between said first and second faces and extending longitudinally between said sides for engaging a conveyor belt passing over said elongated blade body;

a longitudinally extending support frame attached to said elongated body for supporting said elongated body extending transversely of an associated conveyor belt;

said resilient backing member including an upper portion extending upwardly from an upper edge of said support frame;

said elongated body further including an elongated metal face plate attached to said first face of said resilient backing member at said upper portion out of contact with said support frame and having an upper edge adjacent said exposed upper surface of said resilient backing member;

a rigid backing member extending upwardly from said upper edge of said support frame along a substantial portion of said second face of said resilient backing member for supporting said upper portion of said resilient backing member against movement when a force is applied against said metal face plate.

12. The scraper blade assembly of claim 11 wherein said resilient backing member comprises a deformable rubber material whereby said upper surface deforms upwardly when a compressive force is applied against said metal face plate.

13. The scraper blade assembly of claim 12 wherein said resilient backing member comprises 40–60 durometer shore A rubber.

14. The scraper blade assembly of claim 11 wherein said rigid backing member comprises a rigid fiber material.

15. The scraper blade assembly of claim 11 wherein said metal face plate comprises a continuous rigid structure extending the entire length of said elongated blade body for extending substantially the entire width of an associated conveyor belt.

16. The scraper blade assembly of claim 11 wherein said upper surface of said resilient backing member is coextensive with said upper edge of said metal face plate whereby said upper surface forms a support for an associated conveyor belt.

17. The scraper blade assembly of claim 11 including a woven fabric member molded in said resilient member for limiting movement of an upper portion of said resilient member relative to said support frame.

18. The scraper blade assembly of claim 11 wherein said metal face plate defines a continuously curved scraping edge extending across the length of the scraper blade assembly.

19. A scraper blade assembly for a conveyor belt scraper comprising:

an elongated blade body including a resilient backing member formed of a resilient material and defining a central longitudinal scraper blade axis, said resilient backing member including opposing sides, first and second faces extending longitudinally between said sides, and an exposed upper surface located between said first and second faces and extending longitudinally between said sides for engaging a conveyor belt passing over said elongated blade body;

a longitudinally extending support frame attached to said elongated body for supporting said elongated body extending transversely of an associated conveyor belt;

said resilient backing member including an upper portion extending upwardly from an upper edge of said support frame;

said elongated body further including an elongated rigid face plate attached to said first face of said resilient backing member at said upper portion and having an upper edge for scraping material from an associated conveyor belt, said exposed upper surface of said resilient backing member being coextensive with said upper edge of said face plate for providing support to the conveyor belt;

said rigid face plate comprising a continuous rigid structure supported out of contact with said support frame, and extending the entire length of said elongated blade body for extending substantially the entire width of an associated conveyor belt;

a rigid backing member extending upwardly from said upper edge of said support frame along a substantial portion of said second face of said resilient backing member for supporting said upper portion of said resilient backing member against movement when a force is applied against said rigid face plate.

20. The scraper blade assembly of claim 19 wherein said resilient backing member comprises a deformable rubber material whereby said upper surface deforms upwardly when a compressive force is applied against said rigid face plate.

21. The scraper blade assembly of claim 19 wherein said metal face plate defines a continuously curved scraping edge extending across the length of the scraper blade assembly.

* * * * *